Figure 1:
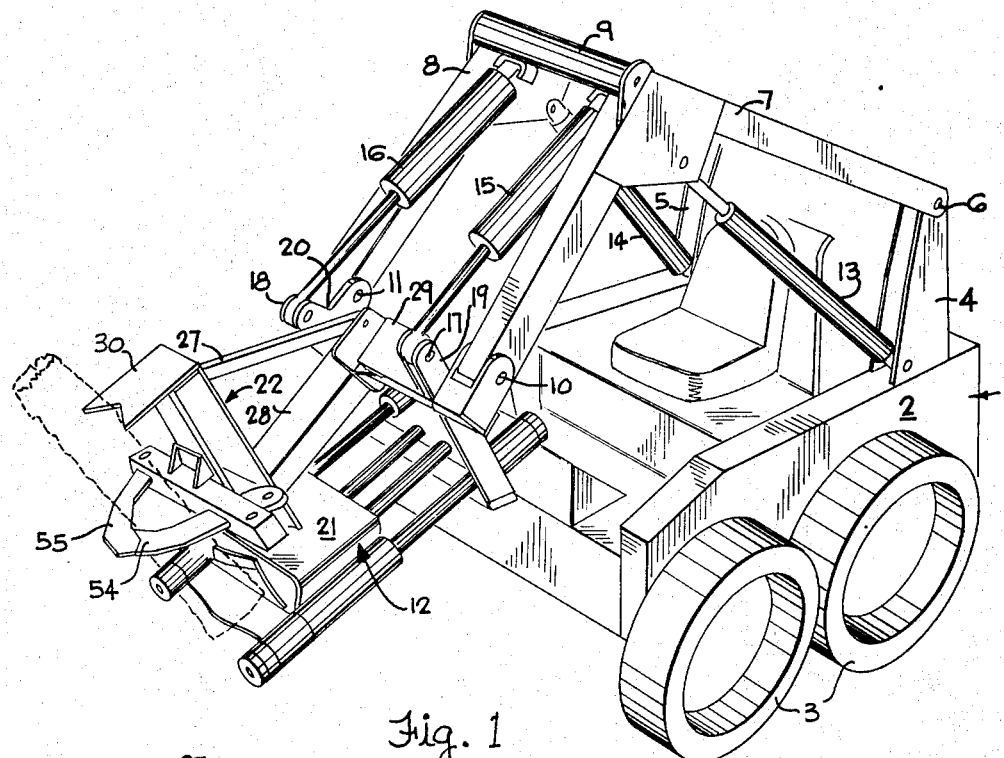

United States Patent
Blonsky

[15] 3,698,457
[45] Oct. 17, 1972

[54] TREE HARVESTING DEVICE AND METHOD

[72] Inventor: Joseph E. Blonsky, Atlanta, Ga.

[73] Assignee: American Pulpwood Association, New York, N.Y.

[22] Filed: Feb. 24, 1971

[21] Appl. No.: 118,331

[52] U.S. Cl. ............................... 144/34 R, 144/3 D
[51] Int. Cl. .................................................. A01g 23/02
[58] Field of Search ..144/2 Z, 3 D, 34 R, 34 E, 34 F, 144/309 AC

[56] References Cited

UNITED STATES PATENTS

| | | | |
|---|---|---|---|
| 3,461,928 | 8/1969 | Siiro | 144/34 R |
| 2,612,194 | 9/1952 | Ingraham et al. | 144/34 E |

*Primary Examiner*—Gerald A. Dost
*Attorney*—Walter M. Rodgers

[57] ABSTRACT

A tree harvesting device is mounted on a wheeled vehicle arranged to manipulate the device into desired orientation relative to the vehicle and includes base structure mounted on the vehicle and adapted for manipulation thereon together with a pair of vertically disposed tree engaging elements arranged to engage one side of a tree to be cut. A cutting blade is movably mounted on the base structure and provided with means for operating the blade into cutting engagement with the tree and toward the lower one of the tree engaging elements. Holding means pivotally mounted on the base structure is arranged to engage a part of a tree opposite from the tree engaging elements and to urge the tree into engagement therewith thereby to relieve the blade of at least a part of the weight of the tree and thus to facilitate cutting and to eliminate cutting damage to the severed portions near the cut. Control means is arranged to swing the blade into and out of its operating position, and latch means is provided for aiding in holding the blade in its operating position during a tree cutting operation. The device may be arranged for rotary movement about a longitudinal axis to accommodate changes in terrain.

4 Claims, 12 Drawing Figures

PATENTED OCT 17 1972 3,698,457

SHEET 1 OF 4

INVENTOR.
JOSEPH E. BLONSKY
BY
Walter M. Rodgers
ATTORNEY

INVENTOR.
JOSEPH E. BLONSKY
BY Walter M. Rodgers
ATTORNEY

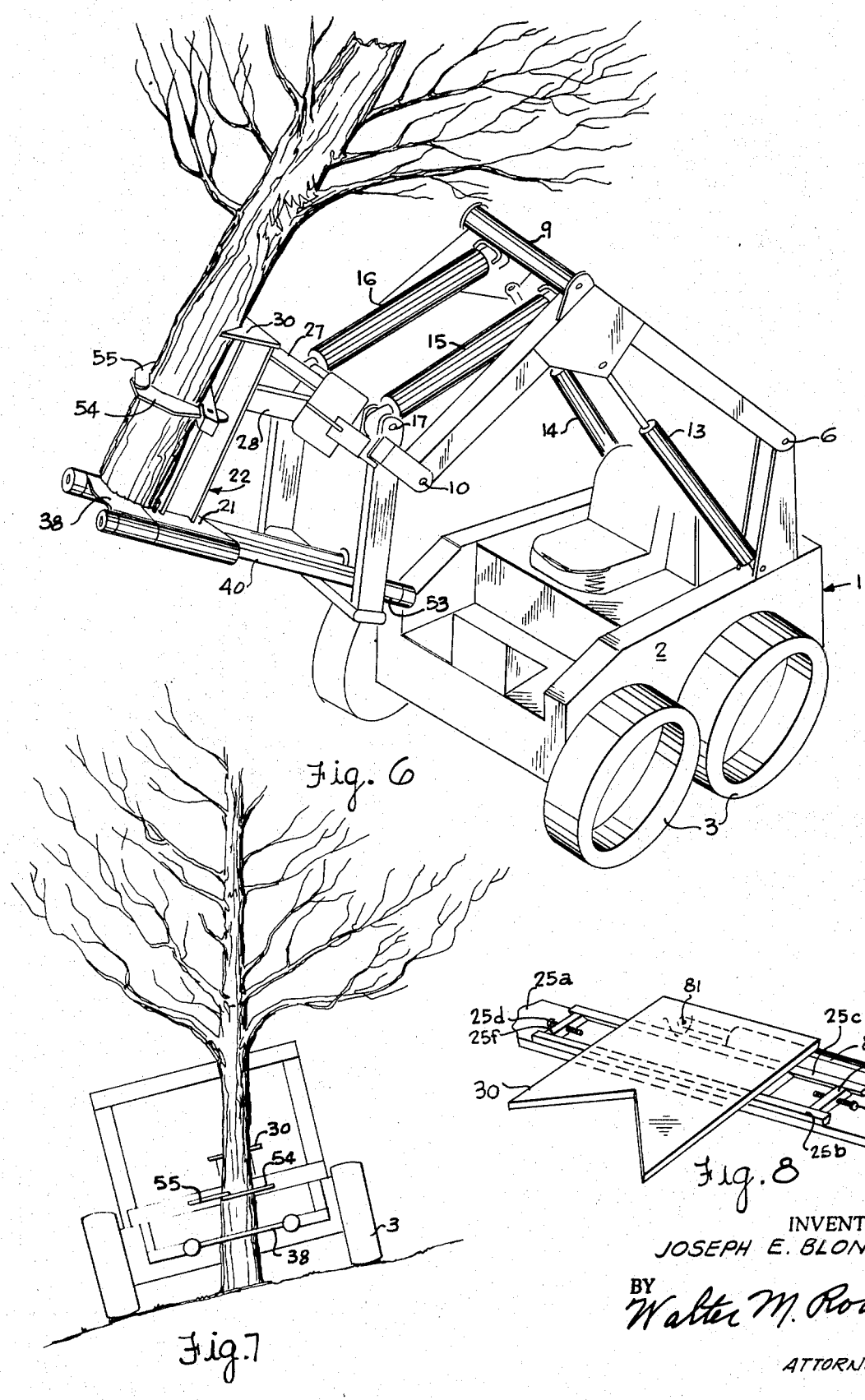

INVENTOR
JOSEPH E. BLONSKY

BY *Walter M. Rodgers*
ATTORNEY

TREE HARVESTING DEVICE AND METHOD

Tree harvesting devices are known in which a cutting operation by shearing action is utilized and in which a tree is felled in a forwardly direction away from the cutting apparatus. Such devices operate satisfactorily as tree felling means but tend to clutter the area ahead and impede subsequent cutting operations.

According to this invention an improved apparatus and method are provided wherein a tree is securely gripped and held in place during a cutting operation following which the tree is manipulated by the cutting apparatus and by the vehicle on which such apparatus is mounted into any desired orientation so that disposition of the felled tree may be effected in a controlled and desired manner. A pair of vertically disposed tree engaging elements are mounted on base structure which in turn is mounted on a wheeled vehicle. In addition a cutting blade is arranged to engage a tree to be felled and to sever the tree by cutting motion which is in the direction of the lower one of the tree engaging elements, and tree holding means mounted on the base structure is arranged to urge the tree into engagement with the tree engaging elements both during and after a tree cutting operation so that easy cutting together with full control and easy handling of the tree are possible.

While the invention is primarily intended for use in forests, it is also well adapted for use on farms, nurseries, post pole and pile processing yards and the like because of its simplicity of design, light weight and ready maneuverability.

Figure 2:
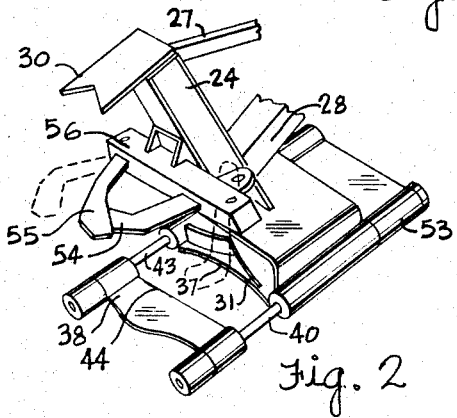
Figure 3:
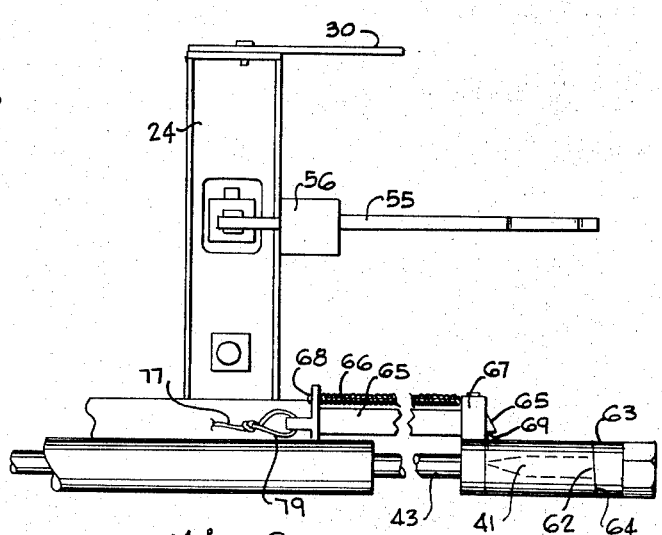
Figure 4:
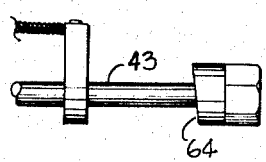
Figure 5:
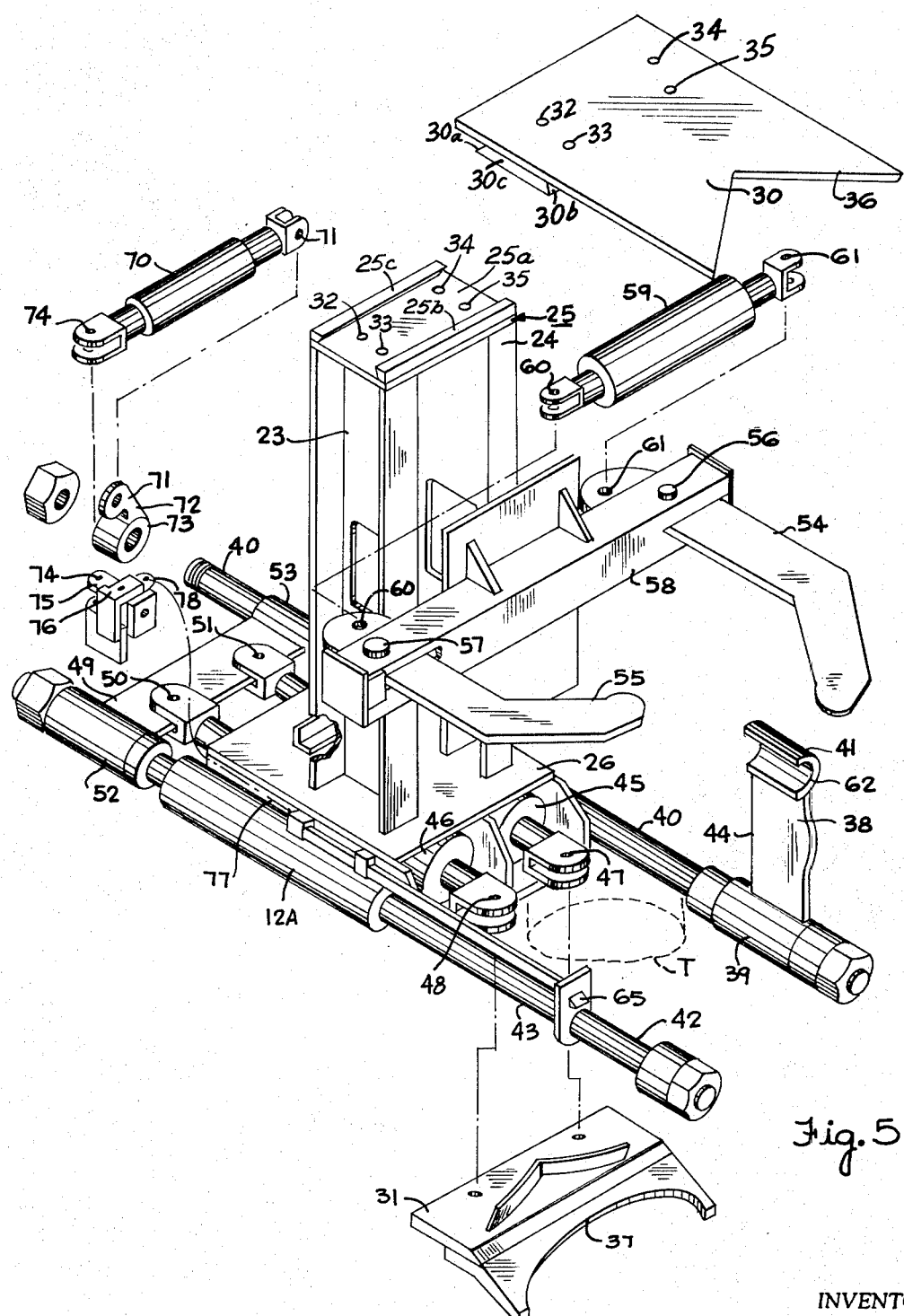
Figure 10:
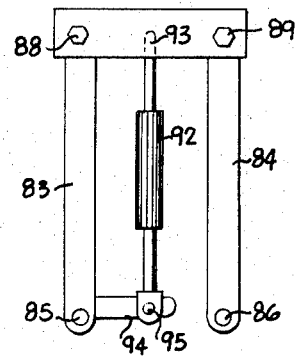
Figure 9:
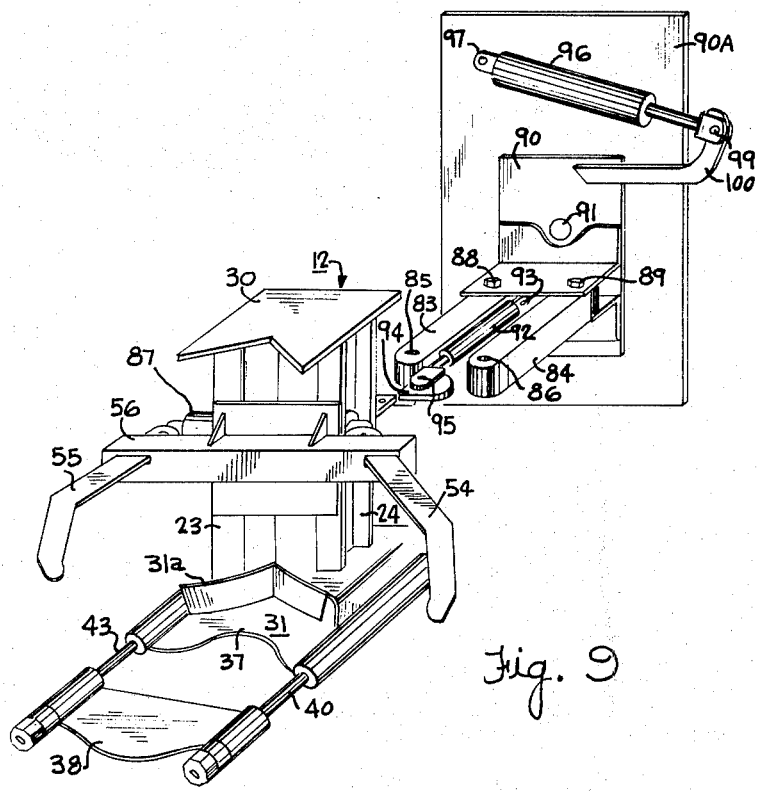
Figure 11:
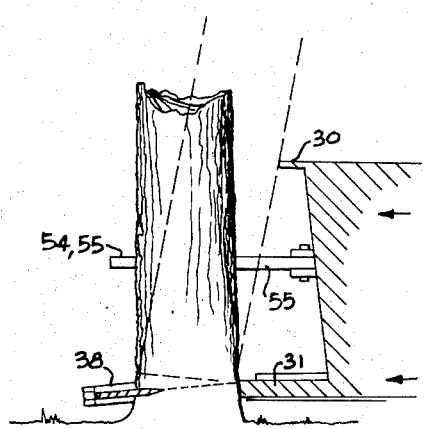
Figure 12:
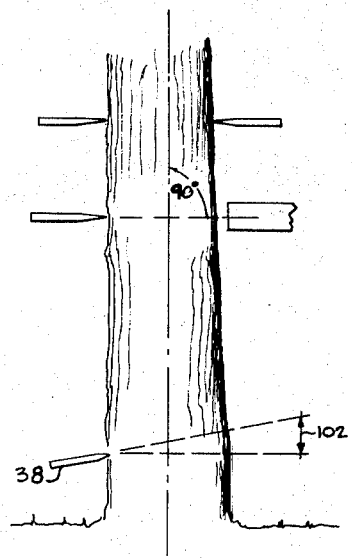

For a better understanding of the invention, reference may be had to the following detailed description taken in conjunction with the accompanying drawings in which FIG. 1 is a perspective view of a tree felling apparatus constructed according to this invention and shown mounted on a wheeled vehicle; FIG. 2 is a perspective view of the tree harvesting device shown in FIG. 1 and from which the vehicle itself is omitted; FIG. 3 is a side view of a portion of the apparatus depicted in FIGS. 1 and 2 as seen from the opposite side; FIG. 4 is an enlarged detailed fragmentary view of a portion of the apparatus shown in FIG. 3; FIG. 5 is an exploded perspective view of a tree felling apparatus such as is shown in FIGS. 1 and 2 but viewed from the opposite side from that depicted in those figures; FIG. 6 is a view similar to FIG. 1 but showing the adaptability of the invention for manipulation into various orientations whereby handling of the tree and disposition thereof may be effected, FIG. 7 is a view similar to FIG. 2 of a modification of the invention whereby the upper tree engaging element is movably mounted on the base structure; FIG. 8 is a perspective view of a portion of the apparatus as shown in FIGS. 1 and 2 and which represents a modification of the invention; FIG. 9 is a perspective view similar to FIG. 2 and which represents a second modification of the invention; FIG. 10 is a schematic diagram illustrating the principle of operation of the device of FIG. 9; and in which FIGS. 11 and 12 are schematic representations of the cutting action achieved by the invention whereby reduced friction and minimum cutting effort which characterize the invention are explained.

In the drawings the numeral 1 generally designates a wheeled vehicle including a frame 2 and a plurality of wheels designated by the numeral 3. A pair of pedestals 4 and 5 are mounted on the wheeled vehicle 1 and afford pivotal mountings such as are indicated by the numeral 6 on which generally L-shaped support elements 7 and 8 are mounted. These L-shaped elements are interconnected by a cross bar 9 and are provided with pivotal mountings 10 and 11 on which the base structure generally designated by the numeral 12 is mounted.

For the purpose of swinging the L-shaped support elements 7 and 8 about their pivotal mountings 6, a pair of fluid motors 13 and 14 are provided. These elements operate in known manner and simply constitute means for swinging the support elements 7 and 8 about their pivotal mountings 6 thereby to raise and lower the pivot points 10 and 11.

For the purpose of tilting the base structure 12 about the pivotal mountings 10 and 11, a pair of fluid motors 15 and 16 are connected through pivots 17 and 18 with arms 19 and 20. As is well known, operation of fluid motors 15 and 16 imparts a force in one direction or the other to pivots 17 and 18 which in turn swing the base structure 12 up and down about the pivotal mountings 10 and 11 by virtue of a force imparted to lever arms 19 and 20 which arms are rigidly affixed to and form a part of base structure 12. Stated in nautical terms such movement may be called pitch.

Base structure 12 in addition to the base plate 21 includes a vertically disposed pedestal structure generally designated by the numeral 22 and which comprises a pair of outwardly faced channels 23 and 24. A base plate generally designated at 25 is welded or otherwise secured atop the channels 23 and 24 and a lower base plate 26 is similarly secured to the lower ends of channels 23 and 24. A pair of struts 27 and 28 are welded or otherwise secured to the upright element 22 and in turn are welded or otherwise secured to the horizontally disposed cross beam 29 which is integrally secured to clamps 19 and 20.

In order to engage and securely grip a tree to be felled, a pair of vertically spaced tree engaging elements 30 and 31 are affixed in a suitable manner to the base structure 12 and preferably to the upright element 22. As shown in the drawings, the upper tree engaging element 30 may be rigidly affixed by bolts to the upper plate 25 which bolts are inserted into apertures 32, 33, 34, and 35 formed in plate and in plate 25a 30. The forward edge of tree engaging element 30 is of V-shaped configuration as indicated at 36 while the forward edge of tree engaging element 31 is arcuate in configuration as indicated at 37. A bracing element of V-shaped configuration is secured to tree engaging element 31 and is designated at 31a. During a tree cutting operation, the edges 36 and 37 of tree engaging elements 30 and 31 are disposed in snug and secure engagement with a side of a tree to be felled.

A cutting operation is performed by means of blade 38 which is pivotally mounted by means of its integral collar 39 with the end of rod 40. Arcuate end portion 41 of blade 38 engages the end portion 42 of rod 43 and the blade occupies its operating position. The cutting edge of the blade is designated by the numeral 44. Rods 40 and 43 are slidably mounted within cylinders 12A welded or otherwise secured to and forming parts of base structure 12.

When a tree is to be felled, the apparatus is first arranged with cutting blade 38 disposed out of its operating position as depicted in FIG. 5. Thereafter the apparatus is manipulated to a position wherein the rods 40 and 43 are disposed astride the tree to be cut which is schematically designated in FIG. 5 by the letter "T." Thereafter the cutting blade 38 is swung into a counter-clockwise direction by rod 40 so that its arcuate end portion 41 overlies the end portion 42 of rod 43.

For applying operating force to blade 38 whereby the blade is moved generally toward the left and upwardly as shown in FIG. 5 to sever the tree "T," force applying means is utilized and may comprise a pair of fluid motors 45 and 46 which are pivotally interconnected with the tree engaging element 31 by means of pins 47 and 48 and to the cross-arm 49 by means of pins 50 and 51. Since the cross-arm 49 is rigidly connected to the left-hand ends of rods 40 and 43 by means of sleeves 52 and 53 which are integral with cross-arm 49, operation of fluid motors 45 and 46 causes the rods 40 and 43 to move generally toward the left as viewed in FIG. 5. Such motion causes the cutting edge 44 of the blade 38 to pass through and sever the trunk of a tree to be felled.

For the purpose of securely holding the tree in fixed relation relative to the base structure 12, holding means is provided and comprises a pair of arms 54 and 55 which are pivoted at 56 and 57 to the cross arm 58 which constitutes an integral part of base structure 12. These arms are swung about their pivots 56 and 57 by means of a fluid motor 59 which is pivotally connected at 60 with the arm 55 and which is pivotally connected at its other end by means of pin 61 with the arm 54. Thus the operation of motor 59 causes the arms 54 and 55 to engage and disengage a tree to be felled as is obvious from the drawing.

From the above description, it is apparent that the arms 54 and 55 constitute holding means and serve to secure a tree trunk securely in position against the V-shaped surface 36 of tree engaging element 30 and against the arcuate surface 37 of tree engaging element 31. Once a tree cutting operation is completed, a substantial portion of the weight of the tree rests on the blade 38 and the holding means comprising arms 54 and 55 serves to secure the tree rigidly in position relative to the base structure 12. Manipulation of the base structure 12 by operation of the fluid motors 13 and 15 swing the tree up and about in such manner as may be desired. For example, the tree may be listed above and over the device 2 if desired in which event the tree is then out of the way and does not impede forward motion of the wheels of device 2 thus greatly facilitating the efficiency and speed of subsequent tree felling operations.

It is obvious that forces of substantial magnitude must be applied to the order 38 in order to effect a cutting operation. In view of this, it is necessary to take special precautions to insure that the blade 38 remains in its operating position as shown in FIGS. 1 and 2 during a cutting operation rather than out of its operating position as shown in FIG. 5. Toward this end, the edge 62 of arcuate portion 41 is beveled as shown in FIG. 3. The collar 63 against which edge 62 bears is also provided with a reversely disposed beveled surface 64 as shown in FIGS. 3 and 4. This beveled arrangement as is obvious from FIGS. 3 and 4 tends to hold the blade 38 in its closed position as is apparent on inspection of FIGS. 3 and 4.

As a further means of insuring that the blade 38 remains in its service position during a cutting operation, a latch 65 is provided and is spring-biased toward the right as viewed in FIG. 3 by a tension spring 66 interconnected at its right-hand end with pedestal 67 affixed to rod 43 and interconnected at its left hand end to bracket 68 integrally formed with latch 65. When the latch is in its latching position as depicted for example in FIG. 3, the lower latching surface 69 thereof overlies the upper edge of arcuate portion 41 of blade 38 and thus aids in holding the blade in its operating position.

In order to release the latch 65, a force is imparted to the latch toward the left as viewed in FIG. 3 which causes the latch to move bodily in that direction against the tension of spring 66.

Unlatching action is achieved automatically in conjunction with movement of the blade 38 to the position depicted in FIG. 5. This movement is effected by control means comprising fluid motor 70 which is pivotally connected by 71 with a crank arm 72 which forms an integral part of a collar 73 which in turn is rigidly secured to rod 40. Fluid motor 70 is also pivotally interconnected at 74 with a crank arm 75 which is pivoted at 76 to structure which is integral with base structure 12. Thus operation of fluid motor 70 imparts rotary motion to crank 75 about pivot 76 which in turn imparts a tension force to flexible cable 77 interconnected with clamp 75 at 78 and with latch 65 at 79 as best shown in FIG. 3.

Connection between crank arm 72, fluid motor 70 and rod 40 preferably is by virtue of a lost motion connection. Thus when fluid motor 70 is activated the crank arm 75 is initially rotated in a counter clockwise direction as viewed in FIG. 5 about pivot 76 and such motion imparts a tension force to cable 77 and in turn unlatches latch 65 prior to the application of turning moment to rod 40 so that the blade 39 is fully unlatched before opening force is applied thereto.

The structure described above provides protection for the fluid motors 45 and 46 because the plate 26 and the sleeves 12A straddle and shield the fluid motors thus making it feasible to use motors of lightweight construction.

From the above description, it is apparent that by the invention, an improved tree harvesting device and method are provided which not only afford efficient cutting operation of the tree but which in addition provide for the efficient and effective manipulation of the device and of the tree following a cutting operation. In this connection the position of the elements as depicted in FIG. 6 is of interest. In FIG. 6 it is apparent that the weight of the tree is disposed in part above the wheeled vehicle during manipulation of the tree. This fact obviously adds to the stability of the vehicle and tends to prevent toppling.

Many trees to be felled are found to be growing on sloping surfaces such as hillsides, gullies and the like. For this reason, it is necessary to provide means whereby the apparatus and method of this invention are adapted to engage and grip a vertically disposed tree trunk even though the wheeled vehicle 2 is disposed on unlevel ground. Toward this end, the tree engaging element such as 30 is movably mounted via bevelled edges 30a and 30b of rib 30c secured to plate 30 and cooperating bevelled edges of ribs 25b and 25c atop plate 25a as shown for example in FIGS. 5, 7 and 8. The sidewise limits of travel of rib 30c may be limited in any suitable manner as by the adjustable set screws 25d and 25e threadedly mounted in crossheads 25f and 25g respectively which are secured at their ends to ribs 25b and 25c. In addition to movably mounting the tree engaging element 30, it is desirable for many applications of the invention to provide means for positively imparting movement to the tree engaging element 30 in a direction which is transverse to the direction of cutting movement of the blade 38. Toward this end of fluid motor designated by the numeral 80 may be provided and interconnected by pivot pins 81 and 82 with the tree engaging element 30 and with the base structure 12 so that operation of the fluid motor is effective to drive the tree engaging element 30 from side to side as may be desired to accommodate unlevel terrain conditions.

From the above description it is obvious that even though the arrangement as disclosed in FIGS. 1–8 inclusive is highly maneuverable, for certain applications of the invention, it may be desirable to provide for even greater maneuverability. Toward this end, the modification of the invention as shown in FIG. 9 may be employed. In FIG. 9 the base structure 12, the tree engaging elements 30 and 31 as well as the cutting element 38 and the holding means such as 54 and 55 are identical to the structure shown and described in connection with FIGS. 1–8 inclusive. In FIG. 9 the base structure 12 and associated parts is arranged for side by side manipulation and is also adapted to move angularly about a horizontal axis which in nautical terms corresponds to "roll" of the base structure and associated parts. For example in FIG. 9 a pair of sturdy horizontally disposed support arms 83 and 84 are pivotally mounted at 85 and 86 to a support bar 87 secured to the channels 23 and 24. These support arms 83 and 84 are also pivotally mounted at 88 and 89 to a base plate 90 which in turn is rotatably mounted about a horizontal shaft 91 which shaft in turn is rigidly affixed in any suitable manner to mounting plate 90A which is fixedly secured to the vehicle 1.

Side by side motion of the base structure 12 and associated apparatus is effected when the support arms 83 and 84 swing about the pivots 88 and 89. Since these arms are of equal length and because they constitute opposite sides of a parallelogram, it is obvious that the base structure 12 and associated apparatus simply swings from side to side when the support arms 83 and 84 swing about their pivotal mountings 88 and 89.

For the purpose of imparting transverse movement to the base structure 12 by virtue of swinging movement of support arms 83 and 84, a fluid motor 92 is pivotally mounted at 93 to the base plate 90 and to a crank arm 94 by means of pivot 95. Thus operation of fluid motor 92 imparts a turning moment to crank arm 94 which in turn causes the arms 83 and 84 to swing about their pivots 88 and 89. This action is illustrated in FIG. 10 schematically. From FIG. 10 it is apparent that a downward or expansive force of fluid motor 92 is imparted to crank arm 94 and causes the arms 83 and 84 to swing in a clockwise direction about their pivots 88 and 89. In like fashion the contraction of fluid motor 92 imparts an upward force to crank arm 94 and thus causes support arms 83 and 84 to swing in a counterclockwise direction about their support pins 88 and 89.

For the purpose of imparting angular movement about shaft 91 of approximately 20 degrees from dead center to the support structure 12 as well as the base plate 90, a fluid motor 96 is pivotally connected by a pin 97 to mounting plate 90A which is securely affixed to the frame of the vehicle and is pivotally connected at pin 99 with crank arm 100 which is rigidly affixed to base plate 90. Thus operation of fluid motor 96 imparts rotary motion to base plate 90 and base support 12 and parts associated therewith about the fixed shaft 91 as is obvious. Stated in nautical terms operation of fluid motor 96 imparts "roll" to base structure 12, to base plate 90 and to parts associated therewith. Of course this rolling movement accomplishes the desired result of readily adapting the mechanism for use on hilly terrain as illustrated in FIG. 7, for example.

From the above description it is apparent that any form of the invention is well adapted for use in conjunction with difficult situations. For example, where two trees are closely spaced together, it is a simple matter to move one of the rods such as 40 or 43 into the space between the trees and thereafter to manipulate the base structure 12 and the cutting arm 38 as well as other parts of the mechanism so as to perform an efficient cutting operation. Furthermore if the tree itself is of the dual trunk type, the mechanism may enter from a direction in which the dual elements are aligned and thus may perform a cutting operation in sequence first on one trunk immediately followed by the cutting of the other one of the dual trunks.

Known tree shear cutting blades ordinarily are rather thick in order to be strong enough to withstand the heavy forces applied thereto. The cutting blade 38 of this invention may be constructed of a relatively thin construction as is obvious from all of the drawings and particularly from FIG. 5. The thin construction of a cutting blade is made possible according to this invention in part because of the holding arms 54 and 55 which urge the tree trunk toward the tree engaging elements and which thus tend to relieve the blade from the necessity of supporting in part the weight of the tree and thereby greatly reduces the blade friction. This principle is illustrated in FIG. 11 from which it is obvious that the schematically represented arms 54 and 55 urge the tree toward the tree engaging element 30 and thus tend to relieve the cutting blade 38 of the weight of the tree. This factor greatly reduces the blade friction which necessarily results when the blade is performing a cutting operation.

Another advantageous feature of the invention has to do with the fact that the cutting blade is not required to move in a perpendicular or normal direction with respect to the axis of the tree. For example, and as is illustrated in FIG. 12, the cutting blade 38 is tilted upwardly at a slight angle to horizontal and hence is arranged to move along a path designated by the numeral 101 which is at a small angle to horizontal. This action provides for much easier cutting and requires much less cutting force due to the fact that a component of the cutting travel of the blade 38 along cut line 101 is in the direction of the grain of the tree. This vertical component is represented by the numeral 102. This angle of cut greatly reduces the force required to perform a cutting operation and is made possible due to the highly adaptable and maneuverable mounting for the cutting mechanism. Thus in nautical terms the "pitch" of the mechanism which is performed by fluid motors 13–16 together with the roll of the device which is performed by fluid motor 96 or the lateral adjustment of parts performed by fluid motor 80, all adapt the device for a great variety of conditions including rough and uneven terrain, difficult to cut trees and the like.

The embodiments of the invention in which an exclusive property or privilege is claimed are defined as follows:

1. A tree harvesting device comprising base structure, a pair of vertically spaced tree engaging elements mounted on said base structure, a cutting blade movably mounted on said base structure and engageable with a tree to be cut on a side thereof opposite said tree engaging elements and movable in a generally horizontal direction toward said tree engaging elements, holding means mounted on said base structure and arranged to engage and urge the tree toward said tree engaging elements, and force applying means for imparting operating movement to said cutting blade, said cutting blade being operated by a pair of generally parallel elongated rods disposed astride a tree to be cut and said blade being pivotally mounted at one end thereof on one end of one of said rods and a bevelled surface being formed on said blade near the other end thereof and disposed to engage an oppositely bevelled surface formed on the other of said rods, said bevelled surfaces being arranged to cooperate so as to aid in holding said blade in its cutting position during a cutting operation.

2. A tree harvesting device comprising base structure, a pair of vertically spaced tree engaging elements mounted on said base structure, a cutting blade movably mounted to said base structure and engageable with a tree to be cut on a side thereof opposite said tree engaging elements and movable in a generally horizontal direction toward said tree engaging elements, holding means mounted on said base structure and arranged to engage and urge the tree toward said tree engaging elements, latch means arranged to engage said blade and to aid in holding said blade in its cutting position during a tree cutting operation, force applying means for imparting operating movement to said cutting blade, and control means interconnected with said blade through lost motion connecting means for imparting movement to said blade into and out of its service position whereby said latch is released before blade control force is imparted to said blade by said control means for swinging said blade out of its service position.

3. A tree harvesting device comprising base structure, a pair of vertically spaced tree engaging elements mounted on said base structure, the upper one of said tree engaging elements being movable in a direction generally transverse to the direction of operating movement of said blade, a cutting blade movably mounted on said base structure and engageable with a tree to be cut on a side thereof opposite said tree engaging elements and movable in a generally horizontal direction toward said tree engaging elements, holding means mounted on said base structure and arranged to engage and urge the tree toward said tree engaging elements, and force applying means for imparting operating movement to said cutting blade.

4. A tree harvesting device according to claim 3 wherein motive means is arranged to impart movement to said upper one of said tree engaging elements.

* * * * *